US008017187B2

(12) United States Patent
Robertson-Young

(10) Patent No.: US 8,017,187 B2
(45) Date of Patent: Sep. 13, 2011

(54) FLAKE PIGMENT MIXTURE AND MULTILAYER COATING METHOD

(75) Inventor: Adam Robertson-Young, Great Yarmouth (GB)

(73) Assignee: Aerochrome Limited, Suffolk (GB)

( * ) Notice: Subject to any disclaimer, the term of this patent is extended or adjusted under 35 U.S.C. 154(b) by 435 days.

(21) Appl. No.: 11/792,441

(22) PCT Filed: Dec. 8, 2005

(86) PCT No.: PCT/GB2005/004739
§ 371 (c)(1),
(2), (4) Date: Aug. 15, 2007

(87) PCT Pub. No.: WO2006/061635
PCT Pub. Date: Jun. 15, 2006

(65) Prior Publication Data
US 2008/0075851 A1    Mar. 27, 2008

(30) Foreign Application Priority Data
Dec. 8, 2004    (GB) .................................. 0426833.0

(51) Int. Cl.
*B05D 1/38* (2006.01)
(52) U.S. Cl. ..................... 427/333; 427/372.2; 427/384; 427/385.5; 427/180; 427/189; 427/195; 427/202; 427/203; 427/336; 427/402
(58) Field of Classification Search ........................ None
See application file for complete search history.

(56) References Cited

U.S. PATENT DOCUMENTS

| | | | |
|---|---|---|---|
| 3,819,119 A | 6/1974 | Coffey et al. | |
| 4,097,639 A | 6/1978 | Millar | |
| 4,971,841 A | 11/1990 | Panush et al. | |
| 5,037,475 A * | 8/1991 | Chida et al. | 106/403 |
| 5,618,343 A * | 4/1997 | Hendi et al. | 106/498 |
| 6,156,379 A | 12/2000 | Terada et al. | |
| 6,235,104 B1 | 5/2001 | Chattopadhyay et al. | |
| 6,299,993 B1 | 10/2001 | Terada et al. | |
| 6,335,057 B1 | 1/2002 | Noura et al. | |
| 2003/0190434 A1 * | 10/2003 | Byers et al. | 427/428 |
| 2004/0241450 A1 | 12/2004 | Ogawa et al. | |

FOREIGN PATENT DOCUMENTS

| | | |
|---|---|---|
| EP | 0401766 A2 | 6/1990 |
| EP | 0936253 A1 | 8/1999 |
| EP | 0990682 | 10/1999 |
| EP | 1025912 A1 | 8/2000 |
| EP | 1482014 A1 | 12/2004 |

(Continued)

*Primary Examiner* — Erma Cameron
(74) *Attorney, Agent, or Firm* — John F. Salazar; Middleton Reutlinger

(57) ABSTRACT

A flake mixture for spraying onto a surface to be coated, the flake mixture comprising a volatile liquid medium and a flake pigment dispersed within said liquid medium, the weight percentage of flake being between 0.002% and 0.15%. A method is also provided the method comprising the steps of: providing an object having a surface to be coated; preparing the surface to be coated by applying a gloss basecoat layer; curing said basecoat layer; providing a flake mixture, flake mixture comprising a volatile liquid medium and a flake pigment dispersed within said liquid medium, the weight percentage of flake being between 0.0002% and 0.15% spraying onto said surface the flake mixture; curing the flake mixture; applying over said flake layer a lacquer layer; and curing said lacquer layer.

18 Claims, 2 Drawing Sheets

FOREIGN PATENT DOCUMENTS

| GB | 0466480 | 5/1937 |
| GB | 1517834 | 3/1976 |
| GB | 2156828 | 10/1985 |
| WO | 9517474 | 6/1995 |

* cited by examiner

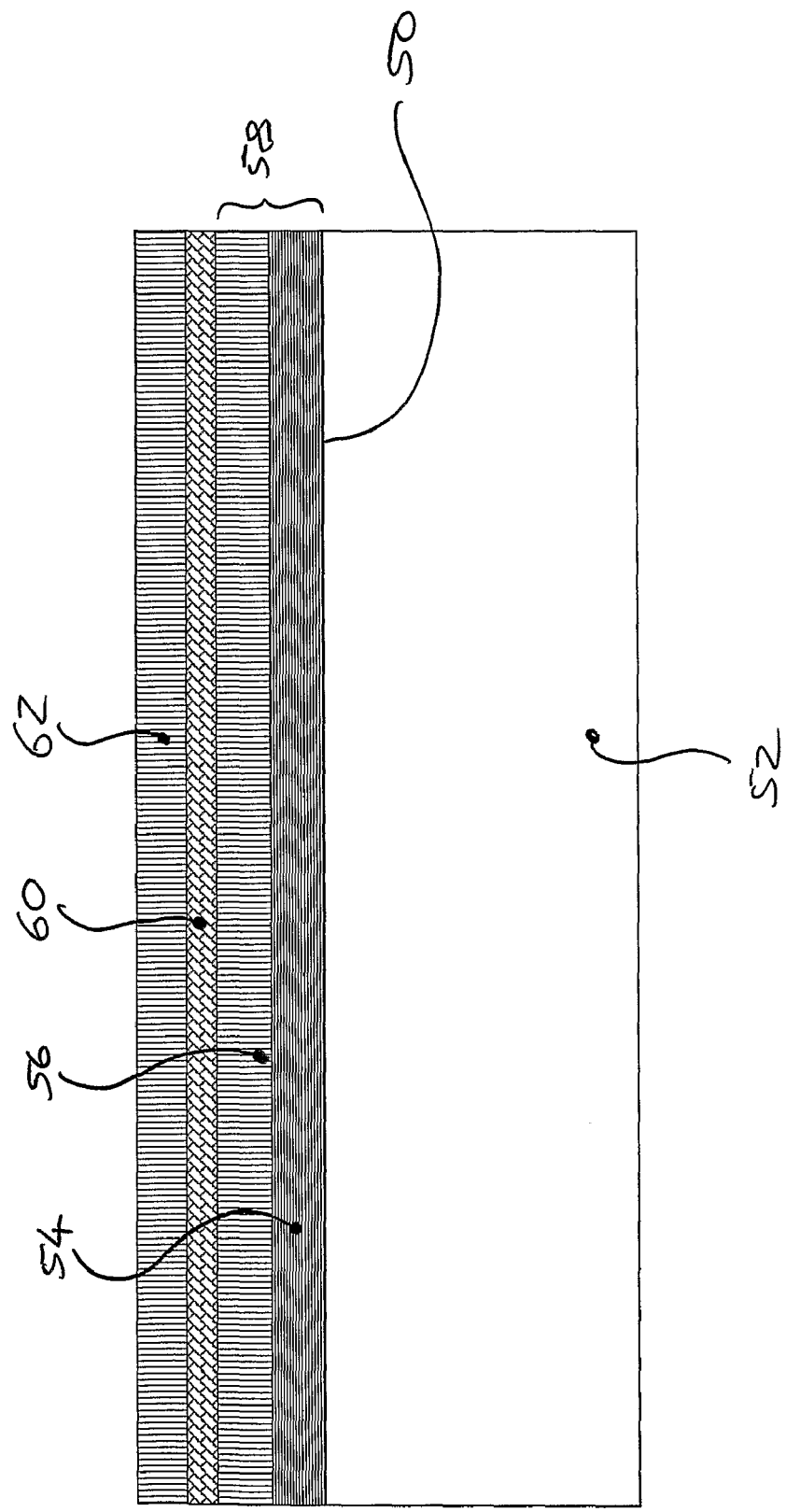

FLAKE PIGMENT MIXTURE AND MULTILAYER COATING METHOD

CROSS REFERENCE TO PRIOR APPLICATION

This application is a national stage filing (35 U.S.C. §371) of PCT/GB2005/004739, filed on Dec. 8, 2005, which claims priority to and benefit from Great Britain Patent Application No. 0426833.0, filed on Dec. 8, 2004, currently pending.

BACKGROUND a. Field of the Invention

The present invention relates to a method of coating a surface, in particular to a method of coating a surface of metal objects to provide a highly reflective surface finish. This method is particularly intended for use in the powder coating industry.

b. Related Art

It is often desirable when producing an object to provide the surface of the object with a highly reflective surface finish. There are several different ways in which such a highly reflective finish can currently be achieved.

Polishing the surface of the object can provide a highly reflective finish, but it is time consuming to produce an acceptable finish and such a finish may be easy scratched or damaged. Electro-plating the surface of an object with a reflective metallic finish, such as chrome plating, can also provide such a finish, but is energy intensive and often involves hazardous chemicals. Electro-plated objects are also vulnerable to the plating layer being chipped or otherwise accidentally removed. It is also known to use a vacuum metallisation process to deposit a layer of metal onto the surface of the object to provide a highly reflective finish, but this involves specialised vacuum metallisation equipment to create the low pressures required and this specialist equipment increases the cost of the process.

It is further known to use a flake pigment in a liquid medium which is sprayed onto a surface and which sets as a binder within the liquid medium binds the flake together and to the surface. The flake content of such liquids is typically above about 1% by weight of the mixture to ensure good coverage of the surface by the flake.

It is an object of the present invention to provide a more convenient method and composition for coating a surface of an object.

SUMMARY OF THE INVENTION

The invention provides a flake mixture for spraying onto a surface to be coated, the composition comprising a volatile liquid medium and a flake pigment dispersed within said liquid medium, the concentration of flake being between 0.002% and 0.2% by weight and preferably less than 0.15% and more preferably less than 0.1%.

The low weight concentration of flake within the mixture results in a thin layer of flake covering the surface to be coated (typically less than 3-5 microns in the finished film) and there is less overlying of the flakes so reflectivity is increased. It has been found that an increased concentration of flake can lead to poor surface adhesion and possible failure of the surface by delamination of some of the flake layer from the surface.

A flake pigment is a particle having an upper surface and lower surface and a maximum particle dimension along the surface that is significantly larger than the depth of the particle between the upper and lower surfaces. The particle dimension is preferably between 2-50 µm and most preferably between 5-20 µm. The thickness of the flake is preferably between 0.02-0.2 µm, more preferably between 0.07-0.09 µm and most preferably substantially 0.08 µm. Therefore the flake has a thickness of between about 5 to 15 and preferably about 10 times less than the maximum particle dimension. The upper and lower surfaces of a flake pigment are typically highly reflective.

The flake dispersed within the liquid is preferably a metallic flake and is preferably a non-leafing flake, but can be any suitable form of flake, for example mica or other flake. A non-leafing metallic flake is preferred as it disperses throughout the liquid rather than floating upon it and this has been found to produces a more consistent surface finish. It is preferred that the flake is a vacuum deposited metal flake such as that originally sold by Wolstenholme™ International under the trade name Metasheen™. Vacuum deposited flake has a naturally highly reflective surface finish due to the method of production. The production of such flakes is known and will not be described in detail.

The flake is preferably an aluminium flake, but can be of any other suitable flake material, preferably metallic, depending upon the surface finish desired. With an aluminium flake the finished surface is typically highly reflective and silver in colour.

The flake mixture has been developed to be applied over a gloss basecoat to achieve highly reflective surface finishes. The gloss basecoat can either be applied using a powder coat process, a painting process or other suitable process. It is preferred that the basecoat is of a dark colour, such as dark blue or green, and is most preferably black or dark grey as the very thin flakes used in the process are slightly translucent so the colour of the basecoat has an effect on the final colour and quality of the finish. The basecoat preferably has a gloss level of greater than 50%, preferably greater than 75% and most preferably greater than 89%. The basecoat may be an gloss acrylic powder coat, or other powder coat, but could also be a gloss spray paint, for example an automotive spray paint using an acrylic, polyurethane or epoxy base. The powder coat is preferably an acrylic based powder coat, but could be any other suitable type.

The flake mixture preferably includes no significant quantity of binder and it has been found that it is advantageous to the reflectivity of the finished surface if no binder is included in the flake mixture, although small quantities, for example a few drops per litre, of a lacquer, which could be described as a binder, have been used in the liquid medium and an acceptable finish has been obtained.

While not wishing to be bound by theory the inventor believes that several effects may be at work to enable this result to be achieved. The basecoat being etched or affected in some way by the liquid medium, the physical nature of the evaporation of the liquid medium and the physical interaction of the flake pigment and liquid medium may all have a significant effect on the quality of the final coated surface.

From the above theory it is preferred that the liquid medium includes at least one base-attacking component that acts as a solvent or an etching agent for at least a surface layer of the basecoat to which the flake mixture is to be applied. In this way, when the flake mixture is applied to the surface of the basecoat, the surface of the basecoat is slightly etched, dissolved or otherwise attacked by the base-attacking component. The attacking of the basecoat enables the flakes to settle on the basecoat layer as the liquid medium evaporates from the surface and to adhere thereto. It is believed that the attacking of the basecoat effectively allows the slightly softened or attacked basecoat surface layer to act as a binder to bind any flake in contact therewith to the basecoat. The low concentration of fake within the liquid medium helps to avoid overloading of any particular area of the surface being coated.

It is preferred that the basecoat is hard and substantially stable before the flake mixture is applied. It is most preferred that the basecoat is fully cured according to the manufacturer's instructions before the application of the flake mixture as this means that the base-attacking component only attacks the surface of the basecoat sufficiently to allow the flake to adhere, but not so much that the attack disrupts the originally gloss surface finish of the basecoat to an extent which has an adverse effect on the final quality of the finish. It has been found that the harder and more cured the basecoat, the better the reflectivity of the subsequent coating and it is believed that this is due to the process outlined above.

Another factor, which is believed to be important, is the rate at which the liquid medium evaporates from the surface to be coated after application. The rate of evaporation should be slow enough to allow the flakes to settle and align on the surface of the basecoat and yet rapid enough to prevent the liquid from running and forming drips in the surface finish during spraying. However, there needs to be sufficient liquid present to dilute the flake and allow the flake mixture to be sprayed onto a surface and for the flake not to have too high a concentration which can lead to significant overlying of the flakes and hence lower reflectivity and structural integrity in the finished surface.

To achieve a suitable balance between these competing factors it is preferred that the liquid medium comprises at least two volatile components. There is preferably a first component, which evaporates rapidly and a second component, which evaporates more slowly such that when at least 60%, and more preferably at least 75% and most preferably substantially all of the first component has evaporated, at least 50% of the second component remains and preferably at least 60% and most preferably at least 70% of the second component remains within the liquid film formed on the surface.

It is thought that the first component in this two component system dilutes the flake within the mixture allowing the flake to be applied in a suitably low concentration. The rapid evaporation of the first component reduces the thickness of the liquid film applied to the surface and it is thought that the rapid film thickness decrease moves the flake towards the surface being coated. The movement of the flake towards the surface being coated may lead to at least portions of some of the flakes contacting the surface and adhering thereto through the mechanism of basecoat attack noted above or through surface energy effects due to the high surface area of the flake and low weight of the flake.

The second component remains in the film for much longer than the first component and it is thought that this stabilisation of the film and much slower decrease in film thickness results in the flake aligning on the surface being coated. It is thought that the relatively slow evaporation of the second component allows the flakes to settle on the surface of the basecoat with less folding such that the resulting surface has a high reflectivity.

It is preferred that the first and second components are added in substantially equal quantities, but may be added as a mixture between 50:50 and 60:40 ratio either way. It should also be understood that the first and second components may be mixtures of chemicals.

This explanation is based upon the relative volatilities of the components providing different evaporation rates and it should be understood that the temperature of the surface to be coated can be adjusted higher or lower to provide evaporation at a suitable rate if the rate is found to be too fast or slow. It appears that the rate of thinning of the film is important and there may be liquids that evaporate at a suitable rate without the need for an additional liquid to stabilise, or rapidly leave, the film.

A yet further effect that has been observed in the film of mixture applied to the surface to be coated is a greater 'sag' resistance than would be expected with the liquid medium alone. This improved 'sag' resistance means that thicker films can be formed than would be expected before drips or runs are created. It is thought that the flake in the low concentration in which it is used in the mixture acts as an anti-sag agent due to the low weight and high surface area of the flake and the possibly surface adhesion with the basecoat or surface effects with the surface of the basecoat.

It is proposed that a combination of these effects are likely to be important in the final reflectivity of the coated surface.

We have found that a suitable flake mixture can be formulated by starting with a vacuum metallisation slurry and then diluting it with a liquid to form the flake mixture. A particularly suitable vacuum metallization slurry has been identified which comprises a non-leafing aluminium flake (10%) in a mixture of ethyl acetate (45%) and isopropyl acetate (45%). It should be understood that the flake mixture of the present method can be created by using a single chemical as the liquid, mixtures of chemicals or otherwise.

The non leafing nature of the flake may be important as it tends to disperse within the liquid medium and therefore is likely to provide a more even surface coating and potentially the flake will disperse more readily to areas of low flake concentration.

Components of the liquid medium may include various liquids typically used as solvents, for example butyl acetate, methyl substituted benzenes such as 1,2,4-trimethyl benzene, naphtha, xylene, aliphatic hydrocarbons, dibasic esters or other solvents. These can be used alone, or in combination to provide a liquid medium having suitable properties. It has been found that an advantageous mixture of solvents can be created by mixing between 4 and 10 grams of the vacuum metallisation slurry mentioned above with 400 ml butyl acetate and 400 ml of a mixture of 1,2,4-trimethyl benzene and solvent naphtha in approximately equal quantities.

Further examples of flake mixtures which have been produced used the following weight percentages as a guide:

| Formulation 1 | |
| --- | --- |
| butyl acetate | 40-60% |
| 1,2,4-trimethyl benzene | 20-40% |
| naphtha solvents | 25-50% |
| Formulation 2 | |
| aliphatic hydrocarbons | 70-90% |
| N-methyl pyrrolidone | less than 10% |
| orange terpenes | 10-20% |
| Formulation 3 | |
| dibasic esters (mixture) | at least 60% |
| water | up to 30% |

800 mls of the liquid mediums mentioned above were mixed with between 4-10 grams of a vacuum metallisation slurry comprising non-leafing aluminium flake (10% w/w) in a mixture of ethyl acetate (45% w/w) and isopropyl acetate (45% W/W).

The dibasic esters are refined dimethyl esters of adipic, glutaric, and succinic acids. The mixture preferably includes 10-25% dimethyl adipate, 55-65% dimethyl glutarate and 15-25% dimethyl succinate, but the weight percentages can of course be adjusted to suit the particular spraying operation being undertaken.

Formulation 3 can be diluted with water and can therefore be formulated to comply with upcoming restrictions on solvent usage in the surface coatings industry. Formulation 2 is also advantageous as the composition is used as a degreaser and comprises low toxicity components which should again be suitable for complying with the upcoming regulations.

The invention also provides a method of coating a surface, the method comprising the steps of:

providing an object having a surface to be coated;
preparing the surface to be coated by applying a gloss basecoat layer;
spraying onto said surface a flake mixture, the flake mixture being as described above; and
curing the flake mixture.

It is preferred that the step of spraying the flake mixture onto the surface comprises the step of providing a spray apparatus having a spray nozzle size between 0.8 mm and 1.4 mm and most preferably substantially 1 mm and having a hose diameter of between 4 mm to 6 mm.

The step of curing the flake mixture preferably comprises removing all the liquid medium from the surface. This may be by air drying, or by heating to actively drive off the remaining liquid medium. It is preferred that a combination of air drying and heat baking is used. Baking the flake layer is preferably performed at between 160 and 210° C.

The step of curing the flake mixture also re-cures the basecoat layer and this may bond the flake to the surface of the basecoat layer.

Once the flake layer has been cured, a lacquer is applied over the flake layer to seal and bind the flake layer to provide a durable finish. The colour of the lacquer also has an effect on the colour of the final product and the following observations are made:

A rule of thumb is that darker the colour of basecoat and the higher the gloss level, the more reflective the finished surface, although for reflectivity the gloss level is most important and the colour of the finish is affected by the colour of the basecoat.

Any basecoat with a grey or silver colour especially with a blue base, for example ral 7015 colour basecoat dramatically increases the brightness of the silver finish and when coupled with a tinted blue lacquer, for example Duraclear™ 201, gives a chrome finish.

By varying the colour and gloss level of the basecoat and the colour of the lacquer, various effects can be established. For example:

Black gloss 80 basecoat and Duraclear™ 200 lacquer gives a polished effect. Black gloss 90 plus basecoat and Duraclear™ 200 lacquer gives a highly polished effect. Light graphite 90 plus basecoat and Duraclear™ 201 lacquer gives a stainless steel effect. Ral 7031, 7021, 7016, 7024 bs381c no 642 gloss 90 plus basecoat and Duraclear™ 201 lacquer gives a chrome effect finish. Silver basecoat and Duraclear™ 200 lacquer gives a bright silver finish. White with blue basecoat with a Duraclear™ 201 or 200 lacquers gives a platinum finish.

BRIEF DESCRIPTION OF THE DRAWINGS

The invention will now be further described, by way of example, with reference to the accompanying drawings, in which:

FIG. 2 shows a cross section through a coated surface.

DETAILED DESCRIPTION

Figure 1:
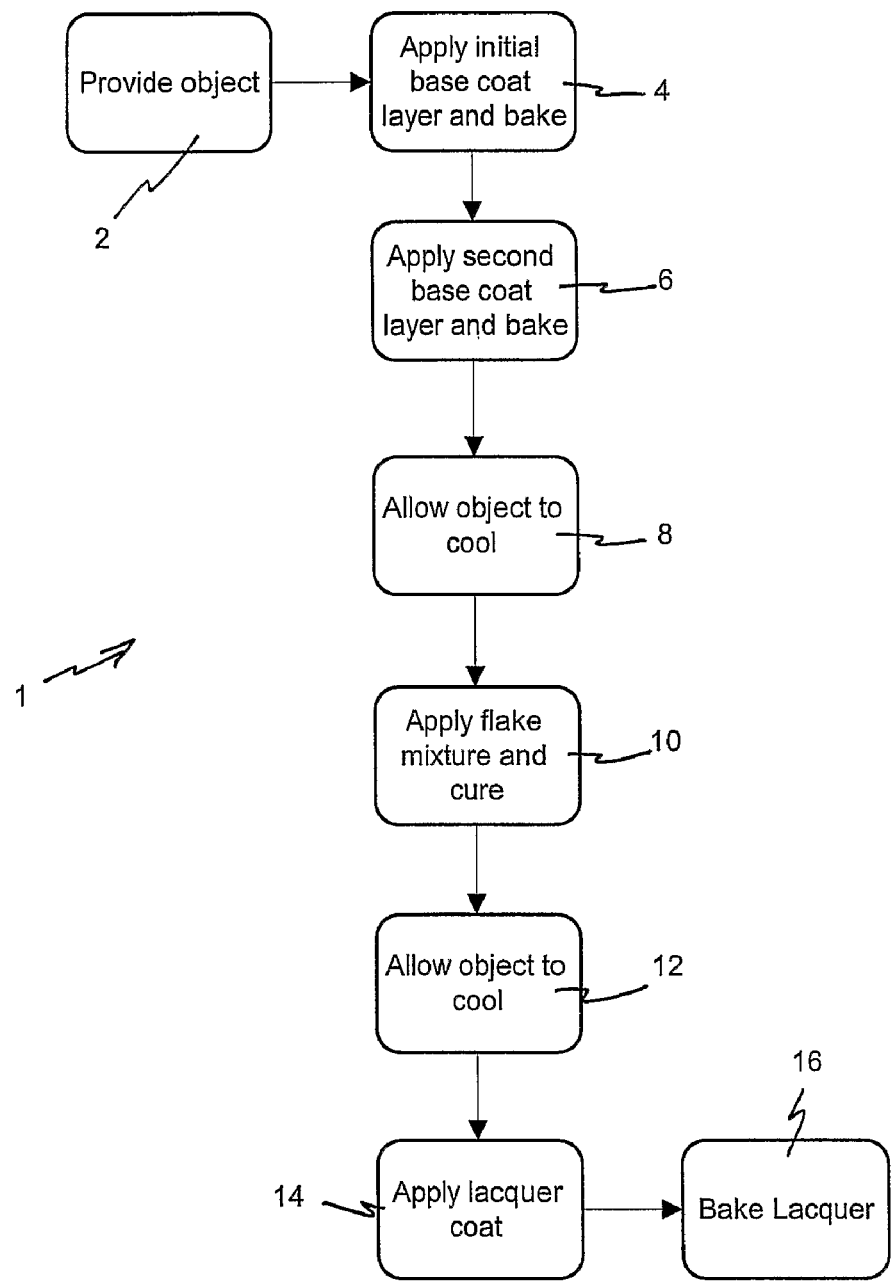
FIG. 1 shows a flowchart of a powder coated primer coating method for an automotive alloy wheel.

FIG. 1 shows a flowchart 1 of a method for coating a surface of an object.

An alloy wheel is provided ion step 2 and initially shot blasted to remove any corrosion or old surface finish from its surface. The wheel is then preheated to about 190° C. for 45 mins to degas the wheel and thus avoid degassing of the alloy during a curing operation which can disrupt the surface quality of the layer being cured.

The degassed wheel is then powder coated in black or grey powder coat and is baked for 10 mins at about 180° C. in step 4. The initial powder coat layer is then coated with a high gloss powder lacquer and wheel is then baked for 30 mins to fully cure the two layer basecoat in step 6

The wheel is powder coated because the shot blasted surface is rough, and the first coat acts as a primer. The first powder coat it is a 180° C. baked polyester powder, but it can be epoxy or epoxy polyester or polyurethane. PCS high gloss black powder coat is preferred to provide as smooth as surface as possible.

A coat of paramount exterior high gloss polyester powder lacquer is applied over the top of the initial layer. The lacquer layer is used because it provides a very smooth surface finish plus a clear lacquer powder coat is much tougher than normal coloured powder coats. The rule of thumb is that as long as the primer powder has the same curing temperature as the paramount lacquer then no failure occurs. Failure is manifested as delamination of the lacquer from the initial primer layer. For example, if you use 200° C. curing powder coat under a 180° C. powder coat delamination will occur, but if you put a 200° C. curing powder on top of a 180° C. powder coat this does not occur.

It should be understood that the one, two or more cost acrylic powder coat basecoat could be substituted for a spray-coated basecoat, for example a polyurethane, epoxy or acrylic paint and/or lacquer, for example a two pack automotive paint.

Once the wheel surface has fully cured, it is cooled to between 10° C. and 100° C. in step 8. The flake mixture is sprayed onto the surface to be coated using a spray gun. In this case a high atomising pressure pot and spray gun. The spray pattern used is high air flow, wide pattern and low volume of flake mixture. The wheel is then baked for 20-30 mins at between 170° C. and 190° C. to drive off all the remaining liquid medium. It is noted that in the spraying phase, the cooler the wheel, the better the reflection. This step is shown in Step 10 of the flowchart 1.

The balance of high atomisation at the spray gun tip and low volume of flake mixture coming through the paint line helps to give an even application of the flake. Using large paint lines and large spray tips at the nozzle gives minimal control over the application so a nozzle tip size of between 0.8 to 1.4 mm and 6 mm paint lines are used with a spray pressure of 30 to 50 psi air pressure.

After the flake layer has been cured as above and cooled in step 12, it is sprayed with acrylic DuPont™ powder lacquer in step 14 and then cured at 170° C. for 20 mins in step 16. In the alternative, it is sprayed with Carrs™ acrylic lacquer, air dried and baked for 20 mins at 200° C.

FIG. 2 shows a cross section through a surface coated using the above process. A surface 50 of an object 52 to be coated is shown covered in the initial base layer 54 and subsequent lacquer layer 56, which together form the basecoat 58.

The flake layer 60 then covers the basecoat 58 and this is finally covered by a final lacquer layer 62.

It should be understood that the invention has been described above by way of example only and that modifications in detail may be made without departing from the scope of the invention as described in the claims.

The invention claimed is:

1. A method of coating a surface, the method comprising the steps of:
    providing an object having a surface to be coated;
    preparing the surface to be coated by applying a gloss basecoat layer;
    curing said basecoat layer to provide a cured basecoat layer having a gloss level greater than 50%;
    providing a flake mixture, the flake mixture comprising a volatile liquid medium and a reflective flake pigment dispersed within said liquid medium, the weight percentage of flake being between 0.002% and 0.1%, the flake mixture including substantially no binder compound;
    the liquid medium comprising at least two volatile liquid components, a first component having first volatility and a second component having a second volatility, wherein the first volatility is higher than the second volatility; and wherein at least one component of the liquid medium acts as a solvent or etching agent for at least a surface layer of the cured gloss basecoat;
    spraying onto said cured gloss basecoat layer the flake mixture;
    curing the flake mixture such that substantially all of the volatile liquid medium is driven from the mixture leaving the reflective flake pigment aligned on the surface of the cured gloss basecoat;
    applying over said cured flake layer a lacquer layer; and
    curing said lacquer layer.

2. The method of claim 1 in which the step of applying the gloss basecoat layer comprises the steps of applying an initial gloss, dark coloured layer and curing said layer and then applying over said initial layer a lacquer layer.

3. The method of claim 1 in which the flake mixture is applied using a spray apparatus having a nozzle size between 0.8 mm and 1.4 mm.

4. The method of claim 1, in which the flake mixture is applied using a spray apparatus having hose diameter of between 4 mm to 6 mm.

5. The method of claim 1, in which the step of curing the flake layer comprises air drying the flake layer for between 10 to 30 minutes and then baking the flake layer at between 170 to 210° C. until cured.

6. The method of claim 1, in which the gloss basecoat layer is applied by powder coating.

7. A flake mixture for use in the method of claim 1, the flake mixture comprising a volatile liquid medium and a reflective flake pigment dispersed within said liquid medium, the weight percentage of flake being between 0.002% and 0.1%, the flake mixture comprising substantially no binder composition; the liquid medium comprising at least two volatile liquid components, a first component having first volatility and a second component having a second volatility, wherein the first volatility is higher than the second volatility; and wherein at least one component of the liquid medium acts as a solvent or etching agent for at least a surface layer of a cured gloss basecoat.

8. The flake mixture of claim 7 in which the flake is non-leafing.

9. The flake mixture of claim 7, in which the flake is an aluminium flake.

10. The flake mixture of claim 7, in which the flake is a vapour deposited aluminium flake.

11. The flake mixture of claim 7, in which the flake has a largest dimension of between 2 and 50 µm and the thickness of the flake is between 0.02 and 0.2 µm.

12. The flake mixture of claim 11, in which the flake has a largest dimension of between 5 and 20 µm and the thickness of the flake is between 0.07 and 0.09 µm.

13. The flake mixture of claim 7, in which the liquid medium comprises at least 30% by weight hydrocarbons having fewer than 7 carbon atoms.

14. The flake mixture of claim 7, in which the liquid medium comprises at least 30% by weight hydrocarbons having at least 8 carbon atoms.

15. The flake mixture of claim 7, in which the liquid medium comprises at least 30% citrus degreaser.

16. The flake mixture of claim 7, in which the liquid medium comprises at least 30% by weight dibasic esters.

17. The flake mixture of claim 16, in which the liquid medium further comprises water to dilute the dibasic esters.

18. A flake mixture for spraying onto a surface to be coated, the composition comprising a volatile liquid medium and a flake pigment dispersed within said liquid medium, the weight percentage of flake being between 0.002% and 0.15%, the flake mixture comprising substantially no binder compound and the volatile liquid medium comprising aliphatic hydrocarbons, N-methyl pyrrolidone and orange terpenes in the following weight percentages of the liquid medium:

| | |
|---|---|
| aliphatic hydrocarbons | 70-90% |
| N-methyl pyrrolidone | less than 10% |
| Orange terpenes | 10-20%. |

* * * * *